US012129818B1

(12) United States Patent
Dunn et al.

(10) Patent No.: US 12,129,818 B1

(45) Date of Patent: Oct. 29, 2024

(54) SEMI-CLOSED CYCLE FAULT TOLERANT CONTROL SYSTEM AND METHOD IN AN EXHAUST SYSTEM

(71) Applicant: Enhanced Energy Group LLC, West Kingston, RI (US)

(72) Inventors: Paul M. Dunn, West Kingston, RI (US); Michael W. Rhoades, Escondido, CA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/507,542

(22) Filed: Nov. 13, 2023

(51) Int. Cl.

*F02M 26/28* (2016.01)
*F02M 26/30* (2016.01)
*F02M 26/34* (2016.01)

(52) U.S. Cl.

CPC ............ *F02M 26/28* (2016.02); *F02M 26/30* (2016.02); *F02M 26/34* (2016.02)

(58) Field of Classification Search

CPC ......... F02M 26/34; F02M 26/30; F02M 26/28
See application file for complete search history.

(56) References Cited

U.S. PATENT DOCUMENTS 6,485,296 B1 * 11/2002 Bender ...................... C10J 3/36 110/212
9,557,052 B2 * 1/2017 Malavasi ................ F23G 5/008
2005/0183642 A1 * 8/2005 Basic, Sr. ............. F26B 23/028 110/224
2011/0302922 A1 12/2011 Li et al.
2013/0174535 A1 7/2013 Van Straaten et al.
2014/0374109 A1 12/2014 Denton et al.
2015/0000293 A1 1/2015 Thatcher et al.
2018/0156136 A1 6/2018 Della-Fera et al.
2023/0134621 A1 5/2023 Baxter et al.
2024/0018907 A1 * 1/2024 Smith ....................... F02C 6/18

FOREIGN PATENT DOCUMENTS

EP 2578839 A1 4/2013

* cited by examiner

*Primary Examiner* — Kevin A Lathers
(74) *Attorney, Agent, or Firm* — Harrity & Harrity, LLP

(57) ABSTRACT

An exhaust system with a semi-closed cycle includes a main flow path and having an inlet node, an outlet node, and a recirculation node between the inlet and outlet nodes; an exhaust gas recirculation flow path configured to divert a recirculated exhaust gas from the main flow path, at the recirculation node, and recirculate the recirculated exhaust gas to the inlet node; an engine configured to produce an exhaust gas based on a gas mixture including ambient air and the recirculated exhaust gas; a draft fan configured to control a gas flowrate through the main flow path; a stack flow path coupled to the main flow path; and a pressure control system configured to regulate a fan speed of the draft fan based on a pressure in the stack flow path in order to maintain the pressure in the stack flow path at a target gauge pressure.

20 Claims, 5 Drawing Sheets

SEMI-CLOSED CYCLE FAULT TOLERANT CONTROL SYSTEM AND METHOD IN AN EXHAUST SYSTEM

TECHNICAL FIELD

The present disclosure relates generally to an exhaust system with a semi-closed cycle with a fault tolerant control system.

BACKGROUND

Engine exhaust emissions of methane ($CH_4$) and carbon dioxide ($CO_2$) have a substantial role in contributing to greenhouse gases in the atmosphere and to climate change. Exhaust systems for engine operation can be related to fuel processing (pyrolysis), exhaust $CO_2$ concentration management (e.g., for purposes of carbon capture), and/or carbon capture for collecting $CO_2$ in an exhaust stream. The exhaust systems may have an ability to operate an engine, such as a piston engine or a gas turbine engine, on an artificial atmosphere, created by a combination of air, cooled exhaust gas recirculation, and optionally oxygen injection (e.g., air enrichment or augmentation), to increase raw $CO_2$ levels in an engine exhaust. A technique of cooled exhaust recirculation, with or without oxygen augmentation, may be referred to as a semi-closed cycle (SCC). The SCC may be used to increase a $CO_2$ concentration for a carbon capture system.

Nearly all carbon capture systems, whether the carbon capture systems include the SCC or not, use diverter valves in one or more exhaust flow paths formed from ducting. A diverter valve is expensive, has slow response times (e.g., long valve opening and closing times), is typically not fast enough to avoid system shutdown during a system fault, and can create a hazard to operations if the diverter valve fails.

The exhaust systems of the present disclosure solve one or more of the problems set forth above and/or other problems in the field.

SUMMARY

In some implementations, an exhaust system with a semi-closed cycle includes a main flow path configured to carry one or more gases, wherein the main flow path has an inlet node, an outlet node, and a recirculation node arranged between the inlet node and the outlet node; an exhaust gas recirculation (EGR) flow path coupled to the main flow path and configured to divert a recirculated exhaust gas from the main flow path, at the recirculation node, and recirculate the recirculated exhaust gas to the inlet node; an engine arranged on the main flow path downstream from the inlet node, wherein the engine is configured to receive a gas mixture including ambient air and the recirculated exhaust gas, and produce an exhaust gas; a cooling system arranged on the main flow path downstream from the engine, wherein the cooling system is configured to cool the exhaust gas; a draft fan arranged on the main flow path downstream from the cooling system, wherein the draft fan is configured to receive at least a first portion of the exhaust gas from the cooling system and control a gas flowrate through the main flow path; a stack flow path coupled to a stack node of the main flow path located between the engine and the cooling system; and a pressure control system configured to regulate a fan speed of the draft fan based on a pressure in the stack flow path in order to maintain the pressure in the stack flow path at a target gauge pressure, wherein the target gauge pressure is zero or less than zero, and wherein the stack flow path is configured to release at least a second portion of the exhaust gas into an atmosphere based on the pressure in the stack flow path being greater than zero.

In some implementations, an exhaust system with a semi-closed cycle includes a main flow path configured to carry one or more gases, wherein the main flow path has an inlet node, an outlet node, and a recirculation node arranged between the inlet node and the outlet node; an EGR flow path coupled to the main flow path and configured to divert a recirculated exhaust gas from the main flow path, at the recirculation node, and recirculate the recirculated exhaust gas to the inlet node; an engine arranged on the main flow path downstream from the inlet node, wherein the engine is configured to receive a gas mixture including ambient air and the recirculated exhaust gas, and produce an exhaust gas; a cooling system arranged on the main flow path downstream from the engine, wherein the cooling system is configured to cool the exhaust gas; a draft fan arranged on the main flow path downstream from the cooling system, wherein the draft fan is configured to receive at least a first portion of the exhaust gas from the cooling system and control a gas flowrate through the main flow path; an EGR fan arranged on the EGR flow path and configured to regulate a flowrate of the recirculated exhaust gas to the main flow path based on a gas concentration of a target gas in the main flow path; a gas concentration sensor provided in the main flow path upstream from the cooling system, wherein the gas concentration sensor is configured to generate a first sensor signal representative of the gas concentration of the target gas, and wherein the target gas is an oxygen gas or a $CO_2$ gas; and a first fan controller configured to regulate a fan speed of the EGR fan based on the first sensor signal in order to regulate the flowrate of the recirculated exhaust gas diverted from the main flow path such that the gas concentration is maintained within a target gas concentration range.

In some implementations, a semi-closed cycle control method in an exhaust system includes providing one or more gases to a main flow path including an inlet node, an outlet node, and a recirculation node arranged between the inlet node and the outlet node; diverting, at the recirculation node, a recirculated exhaust gas from the main flow path back to the inlet node via an EGR flow path coupled to the recirculation node and the inlet node; producing an exhaust gas, via combustion, using a gas mixture comprising ambient air and the recirculated exhaust gas; cooling the exhaust gas to produce a cooled exhaust gas, wherein the recirculated exhaust gas includes a portion of the cooled exhaust gas; and controlling a fan speed of a draft fan arranged on the main flow path to regulate a gas flowrate through the main flow path and a pressure in a stack flow path, wherein the stack flow path is an offshoot of the main flow path, wherein controlling the fan speed of the draft fan comprises regulating the fan speed of the draft fan based on a pressure in the stack flow path in order to maintain the pressure in the stack flow path at a target gauge pressure, and wherein the target gauge pressure is zero or less than zero.

DETAILED DESCRIPTION

Figure 1:
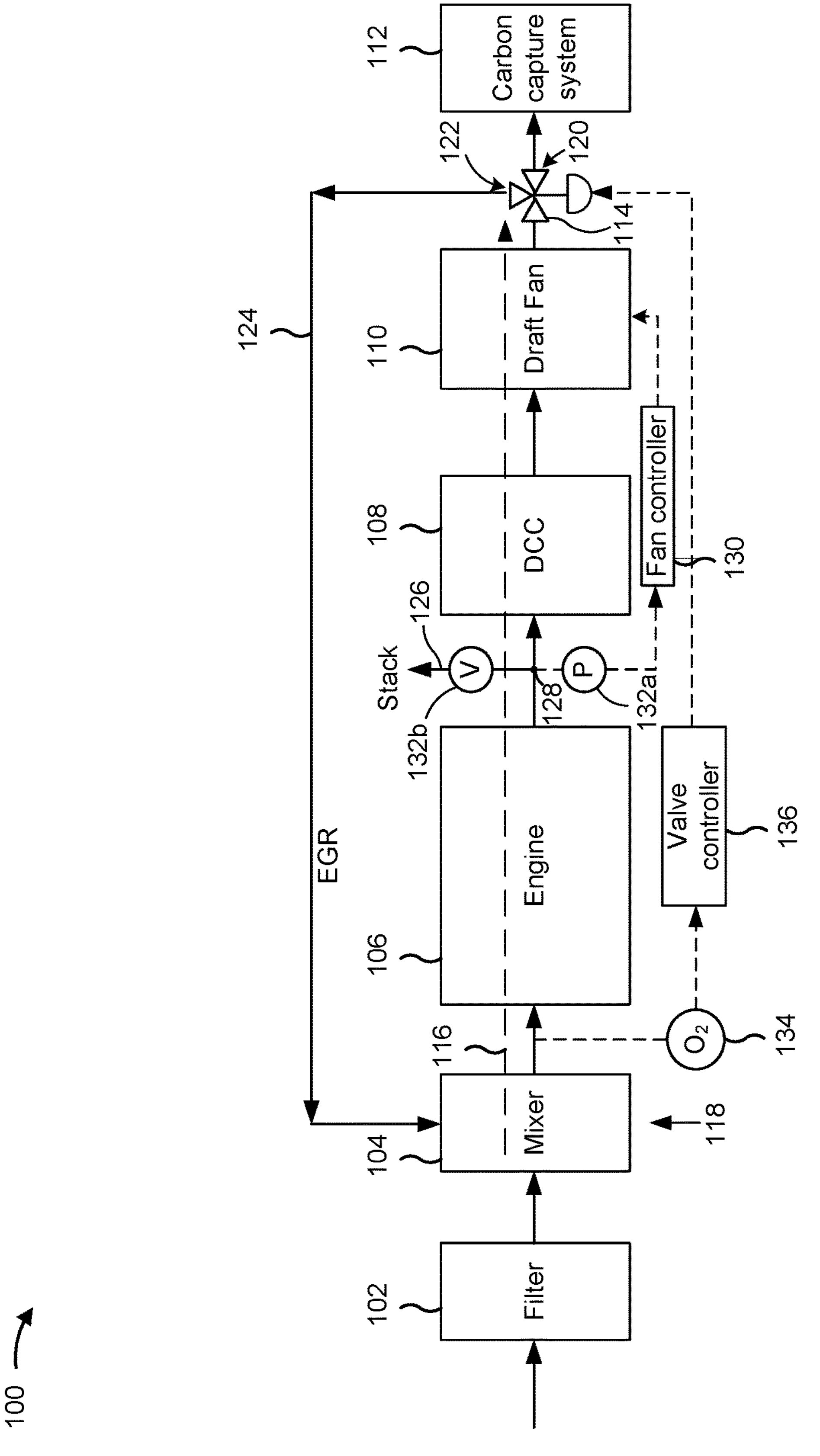
FIG. 1 shows a schematic block diagram of an exhaust system that includes a semi-closed cycle according to one or more implementations.

Diverter valve(s) have typically been arranged in a stack flow path in an exhaust stack (or leading to the exhaust stack) and/or in a main flow path between an engine and a direct contact cooler (DCC). A diverter valve may be a 3-way diverter valve or a t-damper that includes three openings. The three openings are used as inlets to or outlets from the diverter valve. Each opening may include a valve that regulates a flow of fluid through that opening. The valve may be open, closed, or partially open/closed. Thus, depending on how the diverter valve is connected within a system and used, the diverter valve may include an inlet valve (e.g., one inlet opening) and two outlet valves (e.g., two outlet openings), or may include two inlet valves (e.g., two inlet openings) and one outlet valve (e.g., one outlet opening). One or more gasses may enter an inlet and may exit one of the outlets or a mixture of the two outlets. Alternatively, a first gas may enter one inlet, a second gas may enter a second inlet, and both the first gas and the second gas may exit an outlet. The inlet and outlet valves of the diverter valve may be used to control the flow of one or more gases between the three openings in various ways depending on how the diverter valve is connected within the system and used to regulate a flow of the one or more gases.

A first diverter valve may be used to block exhaust gas from exiting the exhaust stack and a second diverter valve may be used to block the exhaust gas from entering the DCC from the engine. Furthermore, a control of an SCC exhaust gas recirculation (EGR) rate is often passive, where the EGR rate is defined by an engine volumetric rate minus a rate of flow to a carbon capture system. For single shaft turbines, the engine volumetric flowrate is essentially constant. As a result, a speed of a draft fan arranged between the DCC and the carbon capture system and, hence, a flowrate are also constant. For a piston engine or in some cases a multi-shaft turbine, a lower EGR flowrate may be desired at lower power levels. Thus, the speed of the draft fan can be constant, providing a given level of EGR flowrate at full load and lowering EGR flowrate levels as an engine load is reduced. A problem with using the first diverter valve and the second diverter valve is that a failure might occur that results in closing both the first diverter valve and the second diverter valve, which would cause a blockage in the main flow path. A blockage of the exhaust in the main flow path of either a piston engine or a gas turbine engine will in most cases result in mechanical failure of a ducting and/or muffler, result in damage to the engine, and/or result in serious injury or death if personnel are in a vicinity of this type of failure. Additionally, the first diverter valve and the second diverter valve are large and expensive, and add a significant cost to the system. Thus, a presence of the first diverter valve in the stack flow path and the second diverter valve in the main flow path between the engine and the DCC increases a risk to the system and to nearby personnel, while also increasing system costs.

This disclosure relates to an exhaust system with an SCC which is applicable to any machine, system, or plant that uses a combustion engine, such as a piston engine or a turbine engine, as an exhaust source that produces an exhaust. The exhaust system is configured with a design that mitigates control and hazard issues that exist today with diverter valves, while also providing improved methods of control for the SCC. The SCC is intended to provide at least one of the following: (1) lower a cost of carbon capture (e.g., in small distributed applications), (2) enable a use of or an increase in performance of a carbon capture system by increasing a $CO_2$ concentration in a gas stream (e.g., exhaust stream) that is provided to the carbon capture system, (3) provide a solution suitable for new construction of exhaust systems or retrofit applications at lower cost, and/or (4) reduce or eliminate hazards to existing operations, while providing a safer tolerance to system faults in a cost effective manner. Small distributed applications may include systems that are generally between 0.5 and 40 MW per engine, with carbon capture targeting the $CO_2$ associated with gas turbines or lean burn piston engines. Depending on a combustion design of the engine, it may be possible to more than double the $CO_2$ concentration using the SCC, which may be performed without use of an oxygen plant, or with oxygen to increase the $CO_2$ concentration by more than a factor of five. An increase in the $CO_2$ concentration may result in a corresponding reduction in an exhaust volume to be processed, and may have other benefits, which may include NOx reduction or high ambient temperature engine derate reduction.

Some implementations may implement an SCC operation to control an oxygen ($O_2$) concentration level and/or a $CO_2$ concentration level as is required by the exhaust system, by changing a methodology of diverter valve use, enabled in part by the SCC, or by eliminating diverter valves altogether by using alternative control techniques, again enabled by the SCC.

FIG. 1 shows a schematic block diagram of an exhaust system 100 that includes a semi-closed cycle according to one or more implementations. The exhaust system 100 includes a filter 102 (e.g., an air filter), a mixer 104 (e.g., an inlet mixer), an engine 106, an exhaust cooling system 108, a draft fan 110 (e.g., a carbon capture fan), and a carbon capture system 112. In addition, the exhaust system 100 may include a diverter valve 114. The diverter valve 114 may be a 3-way diverter valve or a t-damper that includes an inlet valve (e.g., in input path) and two output valves (e.g., two output paths).

Components of the exhaust system 100 may be interconnected by a plurality of manifolds, ducts, and/or pipes that may be configured to carry one or more fluids (e.g., liquids, gases, or gas-liquid mixtures). For example, ducting may be used to form one or more flow paths that connect one or more of the components. The exhaust system 100 may have a main flow path 116 configured to carry one or more gases. The main flow path 116 may have an inlet node 118, an outlet node 120, and a recirculation node 122 arranged between the inlet node 118 and the outlet node 120. Additionally, the exhaust system 100 may have an exhaust gas recirculation (EGR) flow path 124 coupled to the main flow path 116. The EGR flow path 124 may be configured to divert a recirculated exhaust gas from the main flow path 116, at the recirculation node 122, and recirculate the recirculated exhaust gas to the inlet node 118. In other words, the EGR flow path 124 may draw the recirculated exhaust gas (e.g., a portion of the cooled exhaust gas) from the main flow path 116 at the recirculation node 122 and recirculate the recirculated exhaust gas to the inlet node 118. The main flow path 116 and the EGR flow path 124 form the semi-closed cycle in which some of a cooled exhaust is recirculated from the recirculation node 122 back to the inlet node 118. A mixture of the cooled exhaust (e.g., the recirculated exhaust gas) with air increases the concentration of $CO_2$, while decreasing the concentration of $O_2$, at the engine 106. Additionally, the exhaust system 100 may have a stack flow path 126 coupled to a stack node 128 of the main flow path 116 located between the engine 106 and the exhaust cooling system 108.

The mixer 104 is arranged on the main flow path, at the inlet node 118. The mixer 104 may be configured to receive ambient air from the filter 102 and the recirculated exhaust gas from the EGR flow path 124, and produce a gas mixture for the engine 106.

The engine 106 is arranged on the main flow path 116 downstream from the inlet node 118. The engine 106 may receive the gas mixture including the ambient air and the recirculated exhaust gas, and produce an exhaust gas via combustion.

The exhaust cooling system 108 is arranged on the main flow path 116 downstream from the engine 106. The cooling system 108 is configured to cool the exhaust gas to produce the cooled exhaust gas. In some implementations, the exhaust cooling system 108 includes a DCC that is configured to cool the exhaust gas by quenching the exhaust gas. For example, the DCC may reduce a temperature of the exhaust gas to 100° F. or less.

The draft fan 110 is arranged on the main flow path 116 downstream from the exhaust cooling system 108. The draft fan 110 is configured to receive at least a first portion of the exhaust gas from the exhaust cooling system 108 and control a gas flowrate through the main flow path 116. In addition, the draft fan 110 may be configured to push the cooled exhaust gas through one or both outlet valves of the diverter valve 114.

The diverter valve 114 may be arranged at the recirculation node 122, downstream from the draft fan 110. One of the outlet valves of the diverter valve 114 may be an EGR valve (e.g., a first outlet valve that corresponds to the recirculation node 122) configured to divert the recirculated exhaust gas from the recirculation node 122 of the main flow path 116 to the EGR flow path 124. In some implementations, the EGR valve may be configured to regulate a flowrate of the recirculated exhaust gas to the main flow path 116 (e.g., to the inlet node 118) based on a gas concentration of a target gas in the main flow path 116. For example, the flowrate of the recirculated exhaust gas may be controlled by regulating a state of the EGR valve (e.g., an opened state, a closed state, or a partially opened state). Thus, the state of the EGR valve may be regulated to control the flowrate of the recirculated exhaust gas through the EGR flow path 124. The diverter valve 114 may be configured to receive the cooled exhaust gas from the draft fan 110, divert the recirculated exhaust gas from the main flow path 116 to the EGR flow path 124 through the EGR valve, and provide a remaining portion of the cooled exhaust gas to the outlet node 120 through a second outlet valve (e.g., the second outlet valve may correspond to the outlet node 120). The carbon capture system 112 may be coupled to the outlet node 120 and may be configured to capture a $CO_2$ gas present in the remaining portion of the cooled exhaust gas.

The stack flow path 126 may be directly coupled to the main flow path 116, at the stack node 128, without a diverter valve or any other shut-off mechanism that can close off the stack flow path 126 from the main flow path 116. In other words, the stack node 128 is a permanently open node. As a result, the exhaust system 100 may include a pressure control system configured to regulate a fan speed of the draft fan 110 based on a pressure in the stack flow path 126 in order to maintain the pressure in the stack flow path 126 at a target gauge pressure. The target gauge pressure may be zero pounds per square inch gauge (psig) or less than zero (e.g., a negative gauge pressure) such that, during a normal system operation, the exhaust gas in the main flow path 116 does not flow outward from the stack flow path 126 into the atmosphere. A slightly negative gauge pressure in the stack flow path 126 may result in a small amount of air being drawn backwards down the stack, which the exhaust system 100 can tolerate. Thus, the stack flow path 126 may be configured to release at least a second portion of the exhaust gas into the atmosphere based on the pressure in the stack flow path 126 being greater than zero. Thus, the fan speed of the draft fan 110 may be controlled in order to regulate the pressure in the stack flow path 126, which may be used to prevent the exhaust gas from flowing through the stack flow path 126.

The pressure control system may include a fan controller 130 and at least one pressure control sensor **132*a* and/or 132*b* configured to generate a sensor signal corresponding to the pressure in the stack flow path 126. The fan controller 130 may regulate the fan speed of the draft fan 110 based on the sensor signal such that the pressure in the stack flow path 126 is driven toward the target gauge pressure. The fan controller 130 may include one or more processors for processing the sensor signal for determining control values based on a measured pressure and the target gauge pressure. For example, the pressure control sensor 132*a* may be a pressure sensor that measures the pressure in the stack flow path 126 and provides a corresponding sensor signal to the fan controller 130. The pressure control sensor 132*b* may be a gas flow velocity sensor that can detect a gas flow in the stack flow path 126 and/or measure a velocity of the gas flow. The pressure control sensor 132*b* may provide a corresponding sensor signal to the fan controller 130. The fan controller 130 may use one or both sensor signals to regulate the fan speed of the draft fan 110 in order to maintain the pressure in the stack flow path 126 at the target gauge pressure. As a result, a diverter valve located at the stack node 128** can be eliminated.

Moreover, the stack flow path 126 may be configured to release at least the second portion of the exhaust gas from the main flow path 116 into the atmosphere during a system fault of the exhaust system 100. For example, if the draft fan 110 were to fail, the pressure in the stack flow path 126 would become positive and exhaust gas would flow out of the stack flow path 126 into the atmosphere. Allowing the exhaust gas to flow out of the stack flow path 126 (e.g., out of the stack) may prevent one or more components of the exhaust system 100 from being damaged and/or may prevent a hazardous condition from developing that may endanger system personnel. Thus, release of the exhaust gas from the stack may be automatically triggered by a failure of the draft fan 110. The release of the exhaust gas from the stack may be automatically triggered without a delay that would be otherwise be caused by a slow operation of a diverter valve arranged at the stack node 128. Thus, a permanently open node at a junction of the main flow path 116 and the stack flow path 126 in combination with the pressure control system may increase system safety. In addition, elimination of a diverter valve at the stack node 128 may reduce system costs.

The exhaust system 100 may also include a valve control system for controlling the EGR valve of the diverter valve 114. For example, the valve control system may include a gas concentration sensor 134 provided in the main flow path 116 between the mixer 104 and the exhaust cooling system 108. In some implementations, the gas concentration sensor 134 may be arranged between the mixer 104 and the engine 106. Alternatively, the gas concentration sensor 134 may be arranged between the engine 106 and the exhaust cooling system 108. The gas concentration sensor 134 may generate a sensor signal representative of the gas concentration of the target gas. The target gas may be an oxygen gas or a $CO_2$ gas.

Additionally, the valve control system may include a valve controller configured to control the state of the EGR valve of the diverter valve 114 to regulate the gas concentration in the main flow path 116. For example, since the exhaust gas includes $CO_2$, an opening of the EGR valve can be increased in order to increase a $CO_2$ concentration at the inlet node 118 and flowing into the main flow path 116. As a result, the $CO_2$ concentration of the cooled exhaust gas entering the carbon capture system 112 may be increased (e.g., the SCC may be used to increase the $CO_2$ concentration for the carbon capture system 112). In contrast, the opening of the EGR valve can be decreased in order to decrease the $CO_2$ concentration at the inlet node 118 and flowing into the main flow path 116. As a result, the $CO_2$ concentration of the cooled exhaust gas entering the carbon capture system 112 may be decreased. Moreover, by increasing the $CO_2$ concentration at the inlet node 118, an $O_2$ concentration may be decreased (e.g., by volume). Thus, the $CO_2$ concentration and the $O_2$ concentration may be inversely proportional. The valve controller 136 may control the state of the EGR valve based on the sensor signal in order to regulate a flowrate of the recirculated exhaust gas diverted from the main flow path such that the gas concentration measured at the gas concentration sensor 134 is maintained within a target gas concentration range.

The exhaust system 100 provides a pressure balanced stack that eliminates the diverter valves in the stack flow path and in the main flow path between the engine 106 and the exhaust cooling system 108. If any failure occurred, such as a failure of the draft fan 110 or a blockage in the carbon capture system 112, the exhaust would immediately go up the stack, since the stack flow path is always open, and little to no risk to the engine 106 or personnel would exist. When properly pressure balanced, a full exhaust flow from the engine 106 goes through the draft fan 110. As a result, a size of the draft fan 110 may need to be larger in order to move the full exhaust flow through the main flow path. However, an increase in draft fan size, which may result in a higher cost, is offset by an increase in safety. Additionally, the EGR flowrate would be controlled by the diverter valve 114 arranged downstream of the draft fan 110. However, since the diverter valve 114 is arranged in a cold portion of the process (e.g., arranged downstream from the exhaust cooling system 108) and in a higher-pressure region of the process, the diverter valve 114 may be much smaller than the eliminated diverter valves, which would be located upstream from the exhaust cooling system 108, in a lower-pressure region of the process. The EGR valve of the diverter valve 114 may be controlled or set to maintain a desired EGR flowrate level, either measured directly (flow based) or measured based on an $O_2$ level or a $CO_2$ level.

Figure 2:
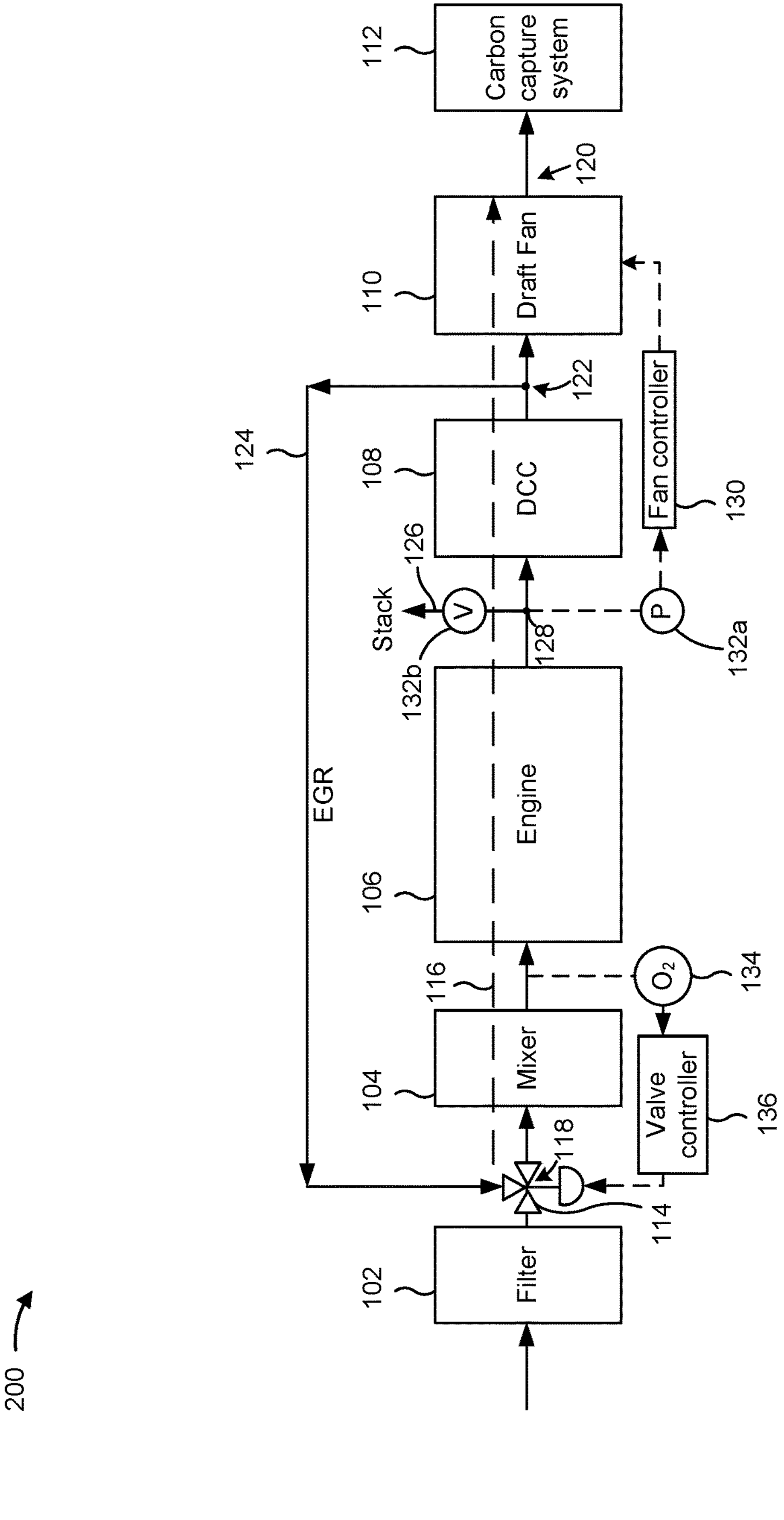
FIG. 2 shows a schematic block diagram of an exhaust system that includes a semi-closed cycle according to one or more implementations.

FIG. 2 shows a schematic block diagram of an exhaust system 200 that includes a semi-closed cycle according to one or more implementations. The exhaust system 200 is similar to the exhaust system 100 described in connection with FIG. 1, with a few differences.

First, the recirculation node 122 is arranged between the exhaust cooling system 108 (e.g., the DCC) and the draft fan 110. The recirculation node 122 may be an open node that draws in a portion of the cooled exhaust gas from the main flow path 116 as the recirculated exhaust gas. The EGR flow path 124 is configured to provide the recirculated exhaust gas from the main flow path 116 at the recirculation node 122 and recirculate the recirculated exhaust gas to the inlet node 118. Thus, the EGR flow path 124 may be directly coupled to the main flow path 116, at the recirculation node 122, without a diverter valve. A mixture of the cooled exhaust (e.g., the recirculated exhaust gas) with air increases the concentration of $CO_2$, while decreasing the concentration of $O_2$, at the engine 106.

Second, the diverter valve 114 is arranged at the inlet node 118, between the filter 102 and the mixer 104. As a result, the diverter valve 114 is configured with two inlet valves and one outlet valve. One of two inlet valves is coupled to the filter 102 and the other of the two inlet valves is the EGR valve coupled to the EGR flow path 124. The outlet valve of the diverter valve 114 is coupled to the mixer 104.

Thus, the diverter valve 114 is arranged at the inlet node 118 and is coupled to the EGR flow path 124 and the main flow path 116. In addition, the EGR valve may be used to regulate the flowrate of the recirculated exhaust gas in the EGR flow path 124 to the main flow path 116 based on the gas concentration of the target gas in the main flow path 116. Thus, the diverter valve 114 may receive the ambient air from the filter 102, may receive the recirculated exhaust gas from the EGR flow path 124 through the EGR valve, and may output the ambient air and the recirculated exhaust gas to the main flow path 116.

The mixer 104 is arranged on the main flow path 116 between the diverter valve 114 and the engine 106. The mixer 104 may receive the ambient air and the recirculated exhaust gas from the diverter valve 114 and may produce the gas mixture for the engine 106. The valve control system, including the gas concentration sensor 134 and the valve controller 136, may control the state of the EGR valve to regulate the gas concentration in the main flow path 116. For example, the valve controller 136 may control the state of the EGR valve based on the sensor signal in order to regulate the flowrate of the recirculated exhaust gas diverted from the main flow path 116 such that the gas concentration is maintained within the target gas concentration range.

The draft fan 110 may be arranged at the outlet node 120. The carbon capture system 112 may be coupled to the draft fan 110 and may be configured to capture a $CO_2$ gas present in a remaining portion of the cooled exhaust gas that is not diverted to the EGR flow path 124 at the recirculation node 122.

Thus, the exhaust system 200 uses a similar pressure balanced technique discussed in connection with FIG. 1, and eliminates the diverter valves in the stack flow path and in the main flow path between the engine 106 and the exhaust cooling system 108. The EGR flowrate control is performed by the diverter valve 114 arranged upstream of the engine 106. The diverter valve 114 provided in the exhaust system 200 may be larger than the diverter valve 114 provided in the exhaust system 100, but is still a low-temperature valve and is still smaller than the eliminated diverter valves. An advantage from an arrangement of the exhaust system 200 is that the draft fan 110 may be sized on only a gas flow to the carbon capture system 112. Thus, the draft fan 110 provided in the exhaust system 200 may be smaller than the draft fan 110 provided in the exhaust system 100. A smaller component is typically less expensive than a larger counterpart. In addition, similar to the exhaust system 100, the EGR valve of the diverter valve 114 may be used to control the EGR flowrate and/or control the $O_2$ level or the $CO_2$ level at the engine inlet.

Figure 3:
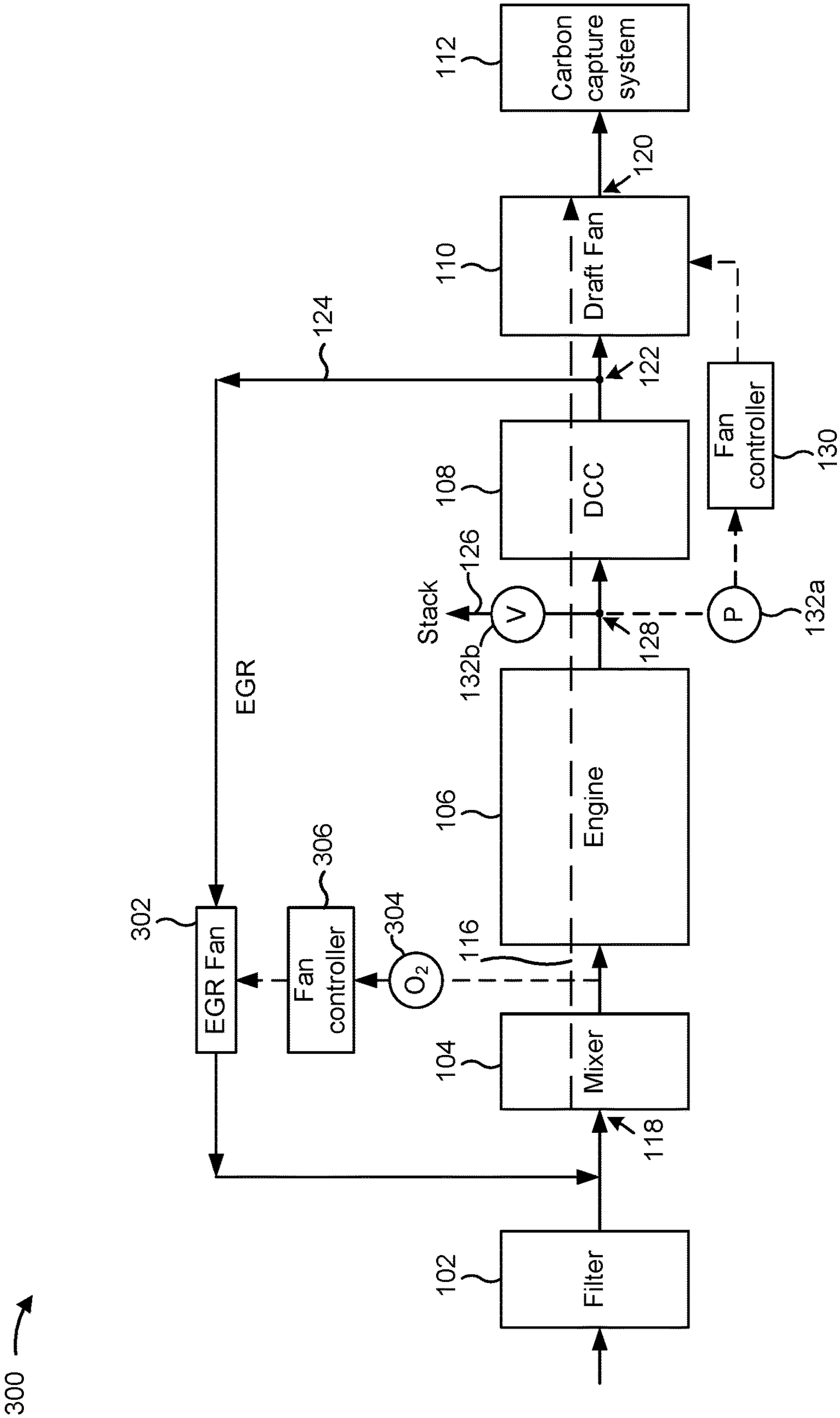
FIG. 3 shows a schematic block diagram of an exhaust system that includes a semi-closed cycle according to one or more implementations.

FIG. 3 shows a schematic block diagram of an exhaust system 300 that includes a semi-closed cycle according to one or more implementations. The exhaust system 300 is similar to the exhaust system 200 described in connection with FIG. 2, with a few differences.

First, the diverter valve 114 is absent. Thus, the EGR flow path 124 may be directly coupled to the main flow path 116, at the inlet node 118 or upstream from the inlet node 118, without a diverter valve. Additionally, the EGR flow path 124 may be directly coupled to the main flow path 116, at the recirculation node 122, without a diverter valve. Thus, the inlet node 118 and the recirculation node 122 may be open nodes.

Second, an EGR fan 302 is arranged on the EGR flow path 124. The EGR fan 302 may be configured to draw in a portion of the cooled exhaust gas into the EGR flow path 124 from the main flow path 116 as the recirculated exhaust gas. In addition, the EGR fan 302 may be configured to regulate a flowrate of the recirculated exhaust gas to the main flow path 116 (e.g., to the inlet node 118). In some implementations, the EGR fan 302 may be configured to regulate the flowrate of the recirculated exhaust gas to the main flow path 116 based on a gas concentration of a target gas in the main flow path 116. The target gas may be an oxygen gas or a $CO_2$ gas. In some implementations, the EGR fan 302 may be used, in combination with the draft fan 110, to maintain zero or negative pressure in the stack flow path 126.

A gas concentration sensor 304 may be provided in the main flow path upstream from the exhaust cooling system 108 (e.g., between the mixer 104 and the exhaust cooling system 108), and may operate similarly to an operation of the gas concentration sensor 134. Thus, the gas concentration sensor 304 may generate a sensor signal representative of the gas concentration of the target gas.

A fan controller 306 may regulate a fan speed of the EGR fan 302 based on the sensor signal provided by the gas concentration sensor 304 in order to regulate the flowrate of the recirculated exhaust gas diverted from the main flow path 116 such that the gas concentration is maintained within a target gas concentration range. The fan controller 306 may include one or more processors for processing the sensor signal for determining control values based on a measured gas concentration and the target gas concentration range. Thus, the fan controller 306, in combination with the gas concentration sensor 304, may be used to regulate the flowrate of the recirculated exhaust gas through the EGR flow path 124 and to regulate the gas concentration of the target gas in the main flow path 116. For example, since the exhaust gas includes $CO_2$, increasing the fan speed of the EGR fan 302 may increase the flow rate of the recirculated exhaust gas and may increase the $CO_2$ concentration at the inlet node 118 and flowing into the main flow path 116.

The mixer 104 may be arranged on the main flow path 116, at the inlet node 118. The mixer 104 may receive the ambient air and the recirculated exhaust gas, and produce the gas mixture for the engine 106.

Since a diverter valve is also eliminated at the stack node 128, the exhaust system 300 between the filter 102 and the carbon capture system 112 (e.g., an entire SCC) may be devoid of diverter valves. Moreover, if either the draft fan 110 or the EGR fan 302 fails, the exhaust system 300 may respond automatically by releasing at least a portion of the exhaust gas into the atmosphere through the stack flow path 126. For example, the pressure in the stack flow path 126 may automatically become positive when either the draft fan 110 or the EGR fan 302 fails. As a result, the permanently open nodes at the inlet node 118, the stack node 128, and the recirculation node 122 in combination with the pressure control system (e.g., the fan controller 130) and/or the fan controller 306 may increase system safety. In addition, since the diverter valves between the filter 102 and the carbon capture system 112 have been eliminated, system costs may be reduced.

The EGR fan 302 may be controlled to achieve a desired EGR flowrate, resulting in a desired level of $O_2$ or $CO_2$ concentration at the engine inlet. The EGR fan 302 may be operated at low power since a pressure that the EGR fan 302 must overcome is only that of a ducting pressure drop and pressure drop at the mixer. The EGR fan 302 may also eliminate a requirement for a purge blower for a gas turbine startup, since the EGR fan 302 can be used to achieve a desired number of air volume sweeps to enable safe startup of the gas turbine. A loss of the EGR fan 302 due to failure may result in some flow going through the stack flow path 126, and a loss of the draft fan 110 may have a similar result. In cases where the draft fan 110 and/or the EGR fan 302 stop operating or operating correctly, the engine 106 can continue to run without any risk of damage until system faults that resulted in one or both fan failures can be addressed.

Figure 4:
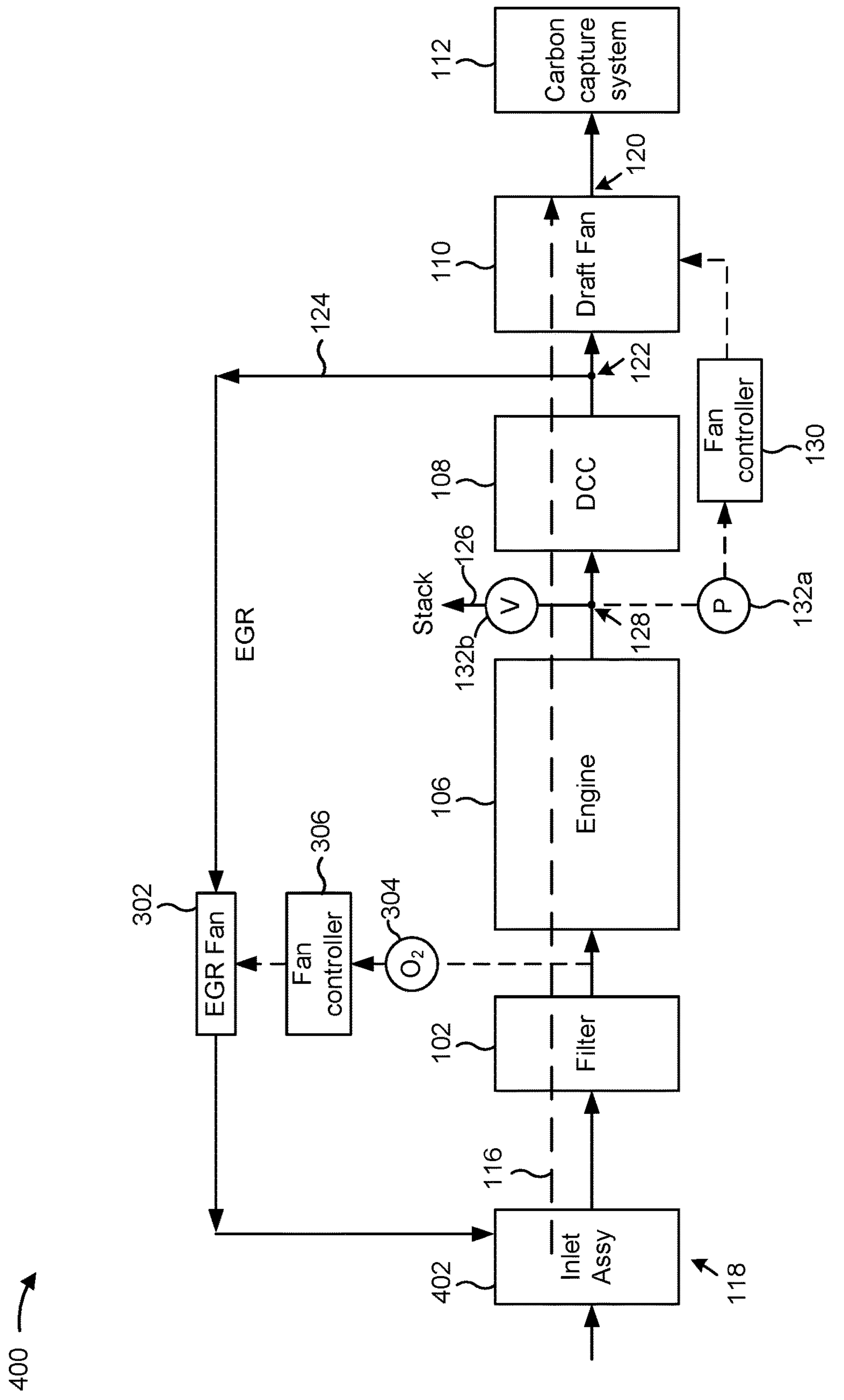
FIG. 4 shows a schematic block diagram of an exhaust system that includes a semi-closed cycle according to one or more implementations.

FIG. 4 shows a schematic block diagram of an exhaust system 400 that includes a semi-closed cycle according to one or more implementations. The exhaust system 400 is similar to the exhaust system 300 described in connection with FIG. 3, with a few differences.

First, the mixer 104 is absent. Instead, an inlet assembly 402 is provided upstream from the filter 102. For example, the inlet assembly 402 may be arranged on the main flow path 116, at the inlet node 118. The inlet assembly 402 may receive ambient air, receive the recirculated exhaust gas from the EGR flow path 124 at the inlet node 118, and output the ambient air and the recirculated exhaust gas to the main flow path 116. The filter 102 (e.g., an air filter) may be arranged on the main flow path 116 between the inlet assembly 402 and the engine 106. The filter 102 may be configured to provide the gas mixture for the engine 106. As a result, the mixer 104 may be eliminated from the main flow path 116, resulting in a further reduction to the system cost. In other words, the exhaust system 400 is devoid of an intake mixer between the inlet assembly 402 and the engine 106.

Second, the gas concentration sensor 304 may be arranged in the main flow path 116 between the filter 102 and the exhaust cooling system 108. For example, the gas concentration sensor 304 may be arranged between the filter 102 and the engine 106, or between the engine 106 and the exhaust cooling system 108.

A twin fan arrangement of the EGR fan 302 and the draft fan 110, and particularly with the EGR fan 302, may create enough pressure to move the inlet node 118 to a location upstream from the filter 102. The combination of turbulence from the EGR fan 302 and turbulence in the filter 102 (e.g., an air filter assembly) may also allow for drastic simplification of, or ideally elimination of, the mixer 104 (e.g., an intake mixer assembly), which may lower system costs. In addition, the exhaust system 400 may be more resistant to foreign object damage for turbine applications since 100% of a turbine inlet flow, including the EGR flow, would go through inlet assembly 402 and the filter 102.

Figure 5:
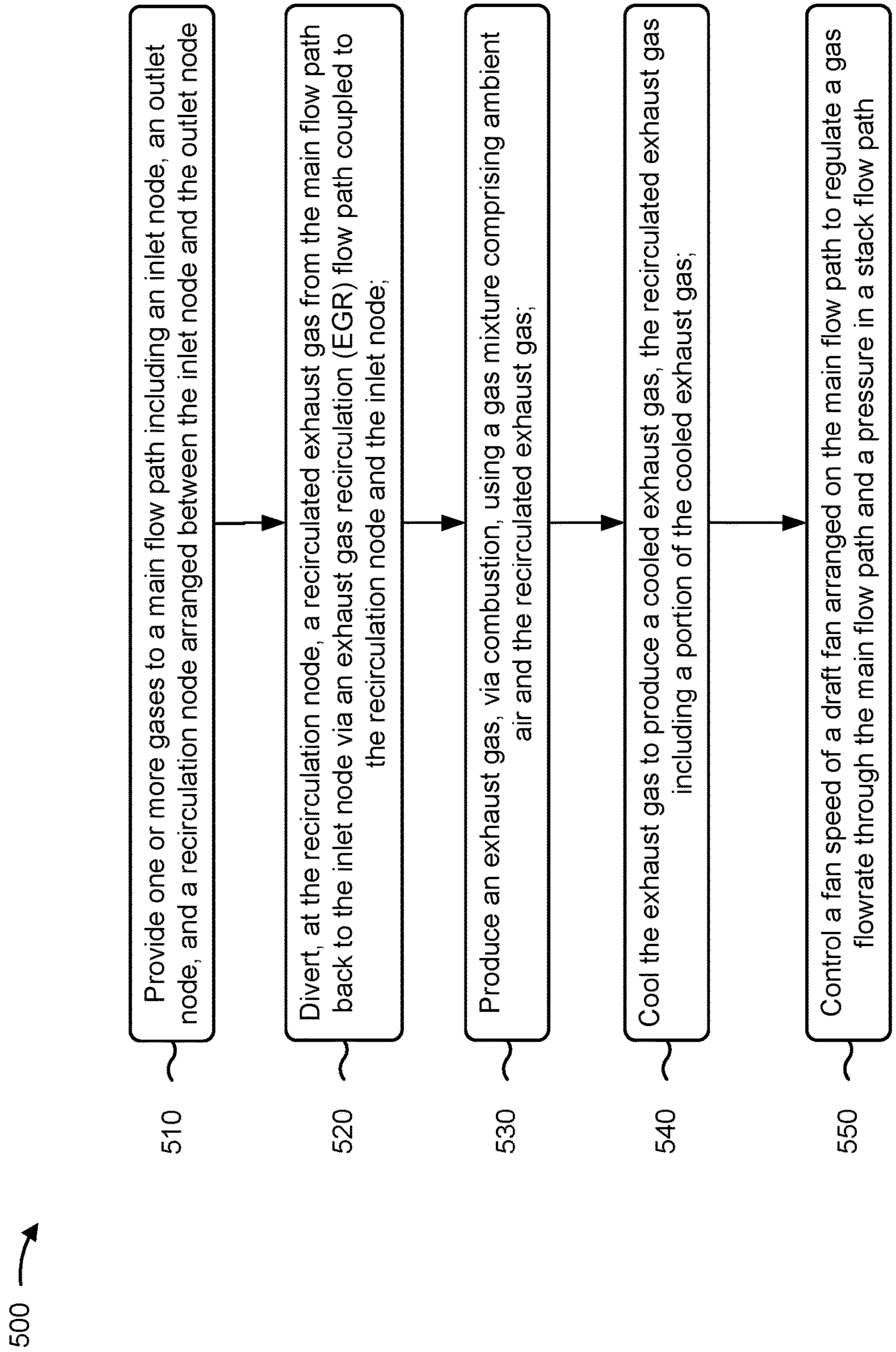
FIG. 5 is a flowchart of an example process associated with semi-closed cycle control method in an exhaust system.

FIG. 5 is a flowchart of an example process 500 associated with semi-closed cycle control method in an exhaust system. One or more process blocks of FIG. 5 may be performed by an exhaust system (e.g., exhaust system 100, 200, 300, or 400). Additionally, or alternatively, one or more process blocks of FIG. 5 may be performed by another device or a group of devices separate from or including the exhaust system, such as another device or component that is internal or external to the exhaust system.

As shown in FIG. 5, process 500 may include providing one or more gases to a main flow path that includes an inlet node, an outlet node, and a recirculation node arranged between the inlet node and the outlet node (block 510). For example, exhaust system 100, 200, 300, or 400 may provide one or more gases to the main flow path, as described above.

As further shown in FIG. 5, process 500 may include diverting, at the recirculation node, a recirculated exhaust gas from the main flow path back to the inlet node via an EGR flow path coupled to the recirculation node and the inlet node (block 520). For example, the exhaust system 100, 200, 300, or 400 may divert, at the recirculation node, the recirculated exhaust gas from the main flow path back to the inlet node via the EGR flow path coupled to the recirculation node and the inlet node, as described above.

As further shown in FIG. 5, process 500 may include producing an exhaust gas, via combustion, using a gas mixture comprising ambient air and the recirculated exhaust gas (block 530). For example, the exhaust system 100, 200, 300, or 400 may produce the exhaust gas, via combustion, using the gas mixture comprising the ambient air and the recirculated exhaust gas, as described above.

As further shown in FIG. 5, process 500 may include cooling the exhaust gas to produce a cooled exhaust gas, wherein the recirculated exhaust gas includes a portion of the cooled exhaust gas (block 540). For example, the exhaust system 100, 200, 300, or 400 may cool the exhaust gas to produce the cooled exhaust gas, wherein the recirculated exhaust gas includes the portion of the cooled exhaust gas, as described above.

As further shown in FIG. 5, process 500 may include controlling a fan speed of a draft fan arranged on the main flow path to regulate a gas flowrate through the main flow path and a pressure in a stack flow path (block 550). For example, the exhaust system 100, 200, 300, or 400 may control the fan speed of the draft fan arranged on the main flow path to regulate the gas flowrate through the main flow path and the pressure in the stack flow path, as described above. The stack flow path may be an offshoot of the main flow path. The controlling of the fan speed of the draft fan may include regulating the fan speed of the draft fan based on a pressure in the stack flow path in order to maintain the pressure in the stack flow path at a target gauge pressure.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

One or more additional aspects may include an exhaust system with a semi-closed cycle (e.g., exhaust system 300 or 400). The exhaust system may include a main flow path configured to carry one or more gases, wherein the main flow path has an inlet node, an outlet node, and a recirculation node arranged between the inlet node and the outlet node. The exhaust system may further include an EGR flow path coupled to the main flow path and configured to divert a recirculated exhaust gas from the main flow path, at the recirculation node, and recirculate the recirculated exhaust gas to the inlet node. The semi-closed cycle may be used to regulate one or more gas concentrations in the main flow path. The exhaust system may further include an engine arranged on the main flow path downstream from the inlet node, wherein the engine is configured to receive a gas mixture including ambient air and the recirculated exhaust gas, and produce an exhaust gas. The exhaust system may further include a cooling system arranged on the main flow path downstream from the engine, wherein the cooling system is configured to cool the exhaust gas. The exhaust system may further include a draft fan arranged on the main flow path downstream from the cooling system, wherein the draft fan is configured to receive at least a first portion of the exhaust gas from the cooling system and control a gas flowrate through the main flow path. The exhaust system may further include an EGR fan arranged on the EGR flow path and configured to regulate a flowrate of the recirculated exhaust gas to the main flow path based on a gas concentration of a target gas in the main flow path. The exhaust system may further include a gas concentration sensor (e.g., gas concentration sensor 304) provided in the main flow path upstream from the cooling system, wherein the gas concentration sensor is configured to generate a first sensor signal representative of the gas concentration of the target gas, and wherein the target gas is an oxygen gas or a $CO_2$ gas. The exhaust system may further include a first fan controller (e.g., fan controller 306) configured to regulate a fan speed of the EGR fan based on the first sensor signal in order to regulate the flowrate of the recirculated exhaust gas diverted from the main flow path such that the gas concentration is maintained within a target gas concentration range.

In addition, the exhaust system may further include a stack flow path coupled to a stack node of the main flow path located between the engine and the cooling system; and a pressure control system configured to regulate a fan speed of the draft fan based on a pressure in the stack flow path in order to maintain the pressure in the stack flow path at a target gauge pressure. The target gauge pressure may be zero or less than zero. The stack flow path may be configured to release at least a second portion of the exhaust gas into an atmosphere based on the pressure in the stack flow path being greater than zero.

Additionally, the pressure control system may include a second fan controller (e.g., fan controller 130) and a pressure control sensor (e.g., pressure control sensor 132*a* or 132*b*) configured to generate a second sensor signal corresponding to the pressure in the stack flow path. The second fan controller may be configured to regulate the fan speed of the draft fan based on the second sensor signal such that the pressure in the stack flow path is driven toward the target gauge pressure.

INDUSTRIAL APPLICABILITY

The exhaust systems 100, 200, 300, and 400 are configured with a design that mitigates control and hazard issues that exist today with diverter valves, while also providing improved methods of control for the SCC. The SCC is intended to provide at least one of the following: (1) lower a cost of carbon capture systems, (2) enable a use of or an increase in performance of a carbon capture system by increasing a $CO_2$ concentration in a gas stream (e.g., exhaust stream) that is provided to the carbon capture system, (3) provide a solution suitable for new construction or retrofit applications at lower cost, and/or (4) reduce or eliminate hazards to existing operations, while providing a safer tolerance to system faults in a cost effective manner. Some implementations may implement an SCC operation to control an $O_2$ concentration level and/or a $CO_2$ concentration level as is required by the exhaust system, by changing a methodology of diverter valve use, enabled in part by the SCC, or by eliminating diverter valves altogether by using alternative control techniques, again enabled by the SCC.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Temperature relative terms, such as "warm," "hot," "hotter," "cold," "colder," "cool," "cooler," and the like, may be used herein for ease of description to describe one element's or feature's relationship to another element(s) or feature(s) and are meant to be relative to each other and not restricted to any specific range of absolute temperature unless specifically defined. Even if specifically defined, absolute temperatures or temperature ranges are intended to serve as examples.

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An exhaust system with a semi-closed cycle, comprising:

a main flow path configured to carry one or more gases, wherein the main flow path has an inlet node, an outlet node, and a recirculation node arranged between the inlet node and the outlet node;

an exhaust gas recirculation (EGR) flow path coupled to the main flow path and configured to divert a recirculated exhaust gas from the main flow path, at the recirculation node, and recirculate the recirculated exhaust gas to the inlet node;

an engine arranged on the main flow path downstream from the inlet node, wherein the engine is configured to receive a gas mixture including ambient air and the recirculated exhaust gas, and produce an exhaust gas;

a cooling system arranged on the main flow path downstream from the engine, wherein the cooling system is configured to cool the exhaust gas;

a draft fan arranged on the main flow path downstream from the cooling system, wherein the draft fan is configured to receive at least a first portion of the exhaust gas from the cooling system and control a gas flowrate through the main flow path;

a stack flow path coupled to a stack node of the main flow path located between the engine and the cooling system; and a pressure control system configured to regulate a fan speed of the draft fan based on a pressure in the stack flow path in order to maintain the pressure in the stack flow path at a target gauge pressure, wherein the target gauge pressure is zero or less than zero, and wherein the stack flow path is configured to release at least a second portion of the exhaust gas into an atmosphere based on the pressure in the stack flow path being greater than zero.

2. The exhaust system of claim 1, wherein the pressure control system includes:

a fan controller; and a pressure control sensor configured to generate a sensor signal corresponding to the pressure in the stack flow path, wherein the fan controller is configured to regulate the fan speed of the draft fan based on the sensor signal such that the pressure in the stack flow path is driven toward the target gauge pressure.

3. The exhaust system of claim 2, wherein the pressure control sensor is a pressure sensor or a gas flow velocity sensor.

4. The exhaust system of claim 1, wherein the stack flow path is directly coupled to the main flow path, at the stack node, without a diverter valve.

5. The exhaust system of claim 1, wherein the cooling system includes a direct contact cooler (DCC) that is configured to cool the exhaust gas by quenching the exhaust gas.

6. The exhaust system of claim 1, wherein the stack flow path is configured to release at least the second portion of the exhaust gas into the atmosphere during a system fault of the exhaust system.

7. The exhaust system of claim 1, further comprising:
a diverter valve arranged at the recirculation node, downstream from the draft fan,
wherein the diverter valve includes an EGR valve configured to regulate a flowrate of the recirculated exhaust gas to the main flow path based on a gas concentration of a target gas in the main flow path, and
wherein the diverter valve is configured to receive the exhaust gas from the draft fan, divert the recirculated exhaust gas from the main flow path to the EGR flow path through the EGR valve, and provide a remaining portion of the exhaust gas to the outlet node.

8. The exhaust system of claim 7, further comprising:
a mixer arranged on the main flow path, at the inlet node, wherein the mixer is configured to receive the ambient air and the recirculated exhaust gas, and produce the gas mixture for the engine;
a gas concentration sensor provided in the main flow path between the mixer and the cooling system,
wherein the gas concentration sensor is configured to generate a sensor signal representative of the gas concentration of the target gas, and wherein the target gas is an oxygen gas or a $CO_2$ gas; and
a valve controller configured to control a state of the EGR valve of the diverter valve to regulate the gas concentration in the main flow path,
wherein the valve controller is configured to control the state of the EGR valve based on the sensor signal in order to regulate a flowrate of the recirculated exhaust gas diverted from the main flow path such that the gas concentration is maintained within a target gas concentration range.

9. The exhaust system of claim 8, further comprising:
a carbon capture system coupled to the outlet node and configured to capture a $CO_2$ gas present in the remaining portion of the exhaust gas.

10. The exhaust system of claim 1, further comprising:
a diverter valve arranged at the inlet node and coupled to the EGR flow path and the main flow path,
wherein the diverter valve includes an EGR valve configured to regulate a flowrate of the recirculated exhaust gas to the main flow path based on a gas concentration of a target gas in the main flow path, and
wherein the diverter valve is configured to receive the ambient air, receive the recirculated exhaust gas from the EGR flow path through the EGR valve, and output the ambient air and the recirculated exhaust gas to the main flow path.

11. The exhaust system of claim 10, further comprising:
a mixer arranged on the main flow path between the diverter valve and the engine,
wherein the mixer is configured to receive the ambient air and the recirculated exhaust gas, and produce the gas mixture for the engine;
a gas concentration sensor provided in the main flow path between the mixer and the cooling system,
wherein the gas concentration sensor is configured to generate a sensor signal representative of the gas concentration of the target gas, and wherein the target gas is an oxygen gas or a $CO_2$ gas; and
a valve controller configured to control a state of the EGR valve to regulate the gas concentration in the main flow path,
wherein the valve controller is configured to control the state of the EGR valve based on the sensor signal in order to regulate the flowrate of the recirculated exhaust gas diverted from the main flow path such that the gas concentration is maintained within a target gas concentration range.

12. The exhaust system of claim 11, further comprising:
a carbon capture system coupled to the draft fan and configured to capture a $CO_2$ gas present in a remaining portion of the exhaust gas that is not diverted to the EGR flow path at the recirculation node,
wherein the recirculation node is arranged between the cooling system and the draft fan,
wherein the EGR flow path is directly coupled to the main flow path, at the recirculation node, without a diverter valve, and
wherein the draft fan is arranged at the outlet node.

13. The exhaust system of claim 1, further comprising:
an EGR fan arranged on the EGR flow path and configured to regulate a flowrate of the recirculated exhaust gas to the main flow path based on a gas concentration of a target gas in the main flow path;
a gas concentration sensor provided in the main flow path upstream from the cooling system,
wherein the gas concentration sensor is configured to generate a sensor signal representative of the gas concentration of the target gas, and wherein the target gas is an oxygen gas or a $CO_2$ gas; and
a fan controller configured to regulate a fan speed of the EGR fan based on the sensor signal in order to regulate the flowrate of the recirculated exhaust gas diverted from the main flow path such that the gas concentration is maintained within a target gas concentration range.

14. The exhaust system of claim 13, further comprising:
a mixer arranged on the main flow path, at the inlet node,
wherein the mixer is configured to receive the ambient air and the recirculated exhaust gas, and produce the gas mixture for the engine, and
wherein the gas concentration sensor is provided in the main flow path between the mixer and the cooling system.

15. The exhaust system of claim 13, wherein the stack flow path is directly coupled to the main flow path, at the stack node, without any diverter valve,
wherein the recirculation node is arranged between the cooling system and the draft fan,
wherein the EGR flow path is directly coupled to the main flow path, at the recirculation node, without any diverter valve.

16. The exhaust system of claim 13, further comprising:
an inlet assembly arranged on the main flow path, at the inlet node,
wherein the inlet assembly is configured to receive the ambient air, receive the recirculated exhaust gas from the EGR flow path, and output the ambient air and the recirculated exhaust gas to the main flow path; and
an air filter arranged on the main flow path between the inlet assembly and the engine, wherein the air filter is configured to provide the gas mixture for the engine.

17. The exhaust system of claim 16, wherein the gas concentration sensor is arranged in the main flow path between the air filter and the cooling system.

18. The exhaust system of claim 16, wherein the stack flow path is directly coupled to the main flow path, at the stack node, without any diverter valve, wherein the recirculation node is arranged between the cooling system and the draft fan, wherein the EGR flow path is directly coupled to the main flow path, at the recirculation node, without any diverter valve.

19. An exhaust system with a semi-closed cycle, comprising:

a main flow path configured to carry one or more gases, wherein the main flow path has an inlet node, an outlet node, and a recirculation node arranged between the inlet node and the outlet node;

an exhaust gas recirculation (EGR) flow path coupled to the main flow path and configured to divert a recirculated exhaust gas from the main flow path, at the recirculation node, and recirculate the recirculated exhaust gas to the inlet node;

an engine arranged on the main flow path downstream from the inlet node, wherein the engine is configured to receive a gas mixture including ambient air and the recirculated exhaust gas, and produce an exhaust gas;

a cooling system arranged on the main flow path downstream from the engine, wherein the cooling system is configured to cool the exhaust gas;

a draft fan arranged on the main flow path downstream from the cooling system, wherein the draft fan is configured to receive at least a first portion of the exhaust gas from the cooling system and control a gas flowrate through the main flow path;

an EGR fan arranged on the EGR flow path and configured to regulate a flowrate of the recirculated exhaust gas to the main flow path based on a gas concentration of a target gas in the main flow path;

a gas concentration sensor provided in the main flow path upstream from the cooling system, wherein the gas concentration sensor is configured to generate a first sensor signal representative of the gas concentration of the target gas, and wherein the target gas is an oxygen gas or a $CO_2$ gas; and a first fan controller configured to regulate a fan speed of the EGR fan based on the first sensor signal in order to regulate the flowrate of the recirculated exhaust gas diverted from the main flow path such that the gas concentration is maintained within a target gas concentration range.

20. A semi-closed cycle control method in an exhaust system, the method comprising:

providing one or more gases to a main flow path including an inlet node, an outlet node, and a recirculation node arranged between the inlet node and the outlet node;

diverting, at the recirculation node, a recirculated exhaust gas from the main flow path back to the inlet node via an exhaust gas recirculation (EGR) flow path coupled to the recirculation node and the inlet node;

producing an exhaust gas, via combustion, using a gas mixture comprising ambient air and the recirculated exhaust gas;

cooling the exhaust gas to produce a cooled exhaust gas, wherein the recirculated exhaust gas includes a portion of the cooled exhaust gas; and controlling a fan speed of a draft fan arranged on the main flow path to regulate a gas flowrate through the main flow path and a pressure in a stack flow path, wherein the stack flow path is an offshoot of the main flow path, wherein controlling the fan speed of the draft fan comprises regulating the fan speed of the draft fan based on a pressure in the stack flow path in order to maintain the pressure in the stack flow path at a target gauge pressure, and wherein the target gauge pressure is zero or less than zero.

* * * * *